Dec. 29, 1970  T. L. COLESS  3,551,217

SUBMERGED ARC WELDING COMPOSITION

Filed Oct. 1, 1968

"Prior Art"

INVENTOR
THOMAS L. COLESS
BY
ATTORNEY

United States Patent Office 3,551,217
Patented Dec. 29, 1970

3,551,217
SUBMERGED ARC WELDING COMPOSITION
Thomas L. Coless, Maplewood, N.J., assignor to Union
Carbide Corporation, New York, N.Y., a corporation
of New York
Filed Oct. 1, 1968, Ser. No. 764,250
Int. Cl. B23k 35/38
U.S. Cl. 148—26                              9 Claims

ABSTRACT OF THE DISCLOSURE

A welding composition, for use in submerged arc welding of high-strength, high-impact steels, containing 40 to 50 weight percent of at least one oxide taken from the class of oxides consisting of CaO, $ZrO_2$, $Al_2O_3$ and MgO; 30 to 45 weight percent $SiO_2$; 8 to 20 weight percent fluoride; and 1 to 8 weight percent $TiO_2$.

---

This invention relates to a submerged arc welding composition. More particularly, this invention relates to an improved submerged arc welding composition for producing welds having unusually good mechanical properties compared to those previously obtained with identical electrodes and available commercial welding compositions in high-strength, high-impact steels.

With the advent of the high-strength, high-impact steels, welding compositions had to be developed so that such steels could be satisfactorily welded with the submerged arc welding process. Two such welding compositions are described in U.S. Pat. 3,100,829, issued Aug. 13, 1963 to Kubli et al. and U.S. Pat. 3,328,212, issued June 27, 1967 to T. L. Coless. While these compositions have proved highly successful, the continued development of still higher strength and higher impact steels required welding compositions which could meet these enhanced requirements.

Accordingly, it is one object of this invention to provide a welding composition which produces welds having unusually high tensile and impact properties compared with those previously obtained with identical electrodes and available commercial welding compositions.

It is another object to provide such a flux which can be used with both direct and alternating current.

A further object is to provide a welding composition which does not add any harmful materials to the weld deposit.

Figure 1:
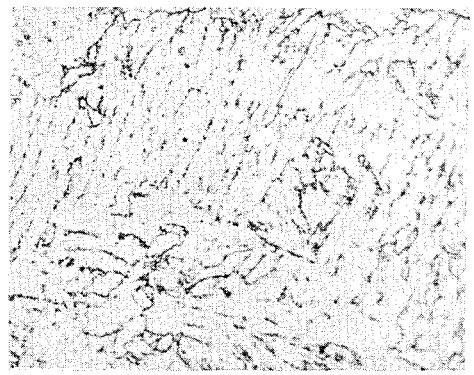
Figure 2:
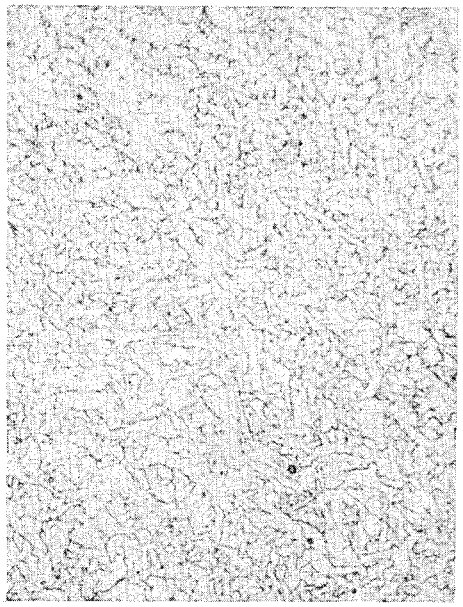

These and other objects, advantages and features of this invention will become more apparent from the following description and drawing wherein FIG. 1 is a microphotograph of part of a weld made with prior art weld compositions at 1000 magnification; and FIG. 2 is a microphotograph of part of a weld made with the weld composition of this invention at 1000 magnification.

According to the present invention, there is provided a submerged arc welding composition consisting essentially of the following ingredients given in weight percent:

From about 40 to about 50 percent of at least one oxide taken from the class of oxides consisting of CaO, $ZrO_2$, $Al_2O_3$, MgO;
From about 30 to about 45 percent $SiO_2$;
From about 1 to about 8 percent $TiO_2$;
From about 8 to about 20 percent fluoride.

When the welding composition is to be used for alternating current, from about ½ to 5 percent of at least one carbonate selected from the group of carbonates formed from the elements consisting of calcium, potassium, sodium, magnesium and lithium with an amount of about 1 percent being preferred, is added to the above ingredients.

Typical preferred fused granular submerged arc welding composition of the invention are listed in Table I below:

TABLE I

| | A | B | C | D |
|---|---|---|---|---|
| Ingredient: | | | | |
| CaO | 45 | 40 | 48 | 41 |
| $SiO_2$ | 36 | 31 | 42 | 35 |
| $Na_3AlF_6$ | 12 | 19 | 6 | 19 |
| $TiO_2$ | 5 | 8 | 2 | 3 |
| Miscellaneous, i.e. (FeO-MgO-$Al_2O_3$), percent | 2 | 2 | 2 | 2 |

It should be obvious that oxides such as $ZrO_2$, $Al_2O_3$ and MgO can be substituted for the CaO.

The invention herein described is predicated on the discovery that $TiO_2$ is a critical ingredient in welding compositions for welding high-strength, high-impact steels. It has been realized, contrary to the prior art, that some $TiO_2$ is beneficial to impact properties even at low temperatures.

Since the flux is manufactured by fusing in a carbon-lined, carbon-arc furnace, it is thought that the $TiO_2$ undergoes reduction to subvalent states such as TiO or possibly even elemental titanium. Examination of the microstructure of welds (see the photograph in the drawings) made with the inventive flux shows a much finer structure as compared to welds made with prior art fluxes. Titanium or its compounds is the active component affecting the microstructure. This finer structure results in increased tensile strength and improved toughness or impact properties. It is possible to achieve the same results or effects with a bonded composition by using a metal compound containing titanium such as ferrotitanium. A titanate such as calcium, sodium, potassium, aluminum, magnesium or zirconium titanates as the source of the active titanium component may also be used.

Another important aspect of the invention is the realization that manganese oxide (MnO) in compositions of the type herein described tends to result in oxide inclusions in the weld. Inclusions in the weld metal are harmful to impact properties. Since the composition contemplated is fused, part of the CaO and $SiO_2$ present in the composition combine to form a tightly bonded calcium silicate thereby minimizing the possibility of silicate type inclusions. Manganese oxide, however, does not form a tightly bonded compound with any of the oxides CaO, $SiO_2$ and $TiO_2$. Accordingly, if MnO is present in the welding composition, it will be available to form inclusions in the weld metal. There is no MnO added to the welding composition of the invention as has been the case in the prior art compositions of the type here being described.

A fluoride, for example calcium fluoride ($CaF_2$) or cryolite ($Na_3AlF_6$), is employed as an ingredient in the inventive composition in the range of 8 to about 20 percent. This range is larger than usually specified for a composition of this type. It has been found that fluorine in the weld puddle combines with hydrogen which may be present from the air, moisture or hydrocarbons in the vicinity. Hydrogen is a prime cause for transverse cracking and fissures which, of course, are harmful. Fluorides also, as is known, enhance weldability by improving the fluidity and electrical conductivity of the flux. Cryolite is the preferred fluoride used.

carbonate is the preferred carbonate for modifying the inventive composition.

TABLE IV

| Welding Composition | Wire 1/8" dia. | Plate 2½" | Amps, AC | Volts | Travel, p.m. | I.P.T., °F. | C.V.N., ft.-lbs. Rm. | 10 | −60 | −100° F. | Yield, p.s.i. | Ultimate, p.s.i. | Elongation, percent | R.A., percent |
|---|---|---|---|---|---|---|---|---|---|---|---|---|---|---|
| Prior art | Linde 44 [1] | ASTM-A-201 | 650 | 31 | 136 | 300 | 75 | 47 | 25 | (²) | 77,100 | 98,800 | 20.5 | 61.0 |
|  |  |  |  |  |  |  | 94 | 96 | 36 | ³19 | 69,700 | 85,000 | 24.0 | 66.0 |
| Inventive | Linde 44 | ASTM-A-201 | 650 | 31 | 136 | 300 | 100 | 76 | 42 | ²18 | 87,400 | 106,700 | 23.5 | 61.3 |
|  |  |  |  |  |  |  | 107 | 97 | 72 | ³48 | 85,500 | 94,300 | 25.0 | 67.9 |

[1] Linde 44=0.13 C; 0.02 S; 0.02 P; 2.08 Mn; 0.65 Ni; 0.41 Mo.
[2] A.W.
[3] S.R. at 1,150° F. 24 hrs.

The compositions of the welding composition given in Table IV is given below:

TABLE V

|  | CaO | SiO₂ | MnO | Cryolite | TiO₂ | CaCO₃ | Miscellaneous, i.e., FeO-MgO-Al₂O₃ |
|---|---|---|---|---|---|---|---|
| Prior art | 43.0 | 40.0 | 3.9 | 7.8 | nil | 2.5 | 2% max. |
| Inventive | 44.6 | 35.6 | -------- | 11.9 | 4.9 | 1.0 | 2% max. |

When operating with alternating current, the use of a carbonate as part of the subject inventive composition is desired. Carbonates not only eliminate the problem of erratic voltage fluctuations as is disclosed in U.S. Pat. 3,328,212 but carbonates present in the range of ½ to 5% and preferably one percent added to the composition given in Table I improve mechanical properties without severely affecting weld bead appearance. The preferred carbonate is calcium carbonate, although other carbonates such as potassium, sodium, magnesium or lithium may be used.

The composition of the invention is manufactured in the same way as most fused compositions. The ingredients are mixed and heated in a carbon-arc furnace until all ingredients are fused. The charge is then chill cast, crushed and sized.

Having described the invention in general terms, the following data are given to illustrate the advantages of the welding composition:

As can be seen from the data, the impact properties achieved with the inventive composition are higher substantially than those achieved with the prior art flux both in the as-welded condition (A.W.) and stress relieved (S.R.). Also, both the tensile and ultimate strengths achieved are substantially higher.

Having described the invention with reference to certain preferred embodiments, it should be understood that certain modifications in the quantity of materials used or the use of equivalent materials is within the spirit and scope of the invention.

What is claimed is:

1. A fused welding composition consisting essentially of 40 to 50 weight percent of at least one oxide taken from the class of oxides consisting of CaO, ZrO₂, Al₂O₃ and MgO; 30 to 45 weight percent SiO₂; 8 to 20 weight percent of a fluoride and 1 to 8 weight percent TiO₂; and up to 2 weight percent max. miscellaneous oxides.

TABLE II

| Weld composition | Wire 5/32" dia. | Plate | Amps, DC | Volts | Travel, i.p.m. | C.V.N., ft.-lbs. Rm. | 0 | −60 | −100° F. | Yield, p.s.i. | Ultimate, p.s.i. |
|---|---|---|---|---|---|---|---|---|---|---|---|
| Prior art | Linde 100 [1] | 1" HY80 [2] | 450 | 30 | 15 | 40 | ---- | 27 | 22 | 105,000 | 115,000 |
| Inventive | Linde 100 | 1" HY80 | 450 | 30 | 15 | 58 | ---- | 48 | 31 | 111,200 | 123,300 |

[1] Linde 100=0.15 C; 2.00 Mn; 0.15 Si; 0.10 S; 0.10 P; 0.53 Mo.
[2] HY 80=0.18 C max; 0.10%–0.40% Mn; 1.00%–1.80% Cr; 2.00%–3.25% Ni; 0.20%–0.60% Mo; 0.15%–0.35% Si; balance iron.

The composition of the prior art welding composition used in Table II is as follows: 44% CaO; 41% SiO₂; 4% MnO; 8% Cryolite; 3% max. miscellaneous, i.e. (FeO-MgO-Al₂O₃).

As can be seen from the above data, in identical welding conditions the inventive composition gives high impact properties and higher tensile properties than a typical prior art composition. This increase in mechanical properties is attributed to the absence of MnO and the addition of TiO₂ and the increase in cryolite in the inventive composition.

The following data was obtained using welding composition D given in Table I above:

2. A fused welding composition consisting essentially of 40 to 50 weight percent CaO, 30 to 45 weight percent SiO₂, 8 to 20 weight percent fluoride and 1 to 8 weight percent TiO₂, and up to 2 weight percent max. miscellaneous oxides.

3. A fused welding composition according to claim 1 wherein the CaO is about 45 weight percent, the SiO₂ is about 36 weight percent, the fluoride is cryolite present in an amount of about 12 weight percent; the TiO₂ is about 5 weight percent and the miscellaneous oxides are about 2 weight percent.

4. A fused welding composition according to claim 1 wherein the CaO is about 40 weight percent, the SiO₂ is about 31 weight percent, the fluoride is cryolite present

TABLE III

| Weld composition | Wire dia. 3/32" | Plate | Amps, DC | Volts | Travel, i.p.m. | C.V.N., ft.-lbs. Rm. | 0 | −60 | −100° F. | Yield | Ultimate |
|---|---|---|---|---|---|---|---|---|---|---|---|
| D | MI-88 [1] | 1" HY 80 | 450 | 30 | 18 | 120 | 100 | 65 | 35 | 99,100 | 108,000 |
| Prior art | Mi-88 | 1" HY 80 | 450 | 30 | 18 | 70 | ------ | 30 | ---------- | 90,000 | 100,000 |

[1] Typical analysis of MI-88, 0.04 C; 1.60 Mn; 0.30 Si; 1.70 Ni; 0.30 Mo.

The following data is illustrative of the advantages of using the inventive welding composition modified with CaCO₃ for making alternating current welds. Calcium in an amount of about 19 weight percent; the TiO₂ is about 8 weight percent and the miscellaneous oxides are about 2 weight percent.

5. A fused welding composition according to claim 1 wherein the CaO is about 48 weight percent, the $SiO_2$ is about 42 weight percent, the fluoride is cryolite present in an amount of about 6 weight percent; the $TiO_2$ is about 2 weight percent and the miscellaneous oxides are about 2 weight percent.

6. A fused welding composition according to claim 1 wherein the CaO is about 41 weight percent, the $SiO_2$ is about 35 weight percent, the fluoride is cryolite present in an amount of about 19 weight percent; the $TiO_2$ is about 3 weight percent and the miscellaneous oxides are about 2 weight percent.

7. A fused welding composition according to claim 1 for use with alternating current wherein from about ½ to about 5 weight percent of at least one carbonate selected from the group of carbonates formed from the elements consisting of calcium, potassium, sodium, magnesium and lithium is added to the welding composition.

8. A fused welding composition according to claim 7 wherein the carbonate is calcium carbonate.

9. A fused welding composition according to claim 7 wherein about one percent by weight of the carbonate is added to the welding composition.

References Cited

UNITED STATES PATENTS

| | | | |
|---|---|---|---|
| 2,435,852 | 2/1948 | Stringham | 148—26 |
| 2,748,040 | 5/1956 | Conn | 148—26 |
| 2,895,863 | 7/1959 | Stringham et al. | 148—26 |
| 3,068,128 | 12/1962 | Shrubsall et al. | 148—26 |
| 3,320,100 | 5/1967 | Coless | 148—26 |

L. DEWAYNE RUTLEDGE, Primary Examiner

W. W. STALLARD, Assistant Examiner